G. C. SURLS.

Assignor to E. W. BINGHAM.

Furnace for Burning-Kiln.

No. 8,230. Reissued May 14, 1878.

WITNESSES

Villette Anderson

F. J. Masi

INVENTOR

Geo. C. Surls.

by E. W. Anderson his ATTORNEY

N. PETERS, PHOTO-LITHOGRAPHER, WASHINGTON, D. C.

UNITED STATES PATENT OFFICE.

GEORGE C. SURLS, OF ROCHESTER, PENNSYLVANIA, ASSIGNOR TO EDWARD W. BINGHAM.

IMPROVEMENT IN FURNACES FOR BURNING-KILNS.

Specification forming part of Letters Patent No. 155,269, dated September 22, 1874; Reissue No. 8,230, dated May 14, 1878; application filed May 1, 1878.

*To all whom it may concern:*

Figure 1:
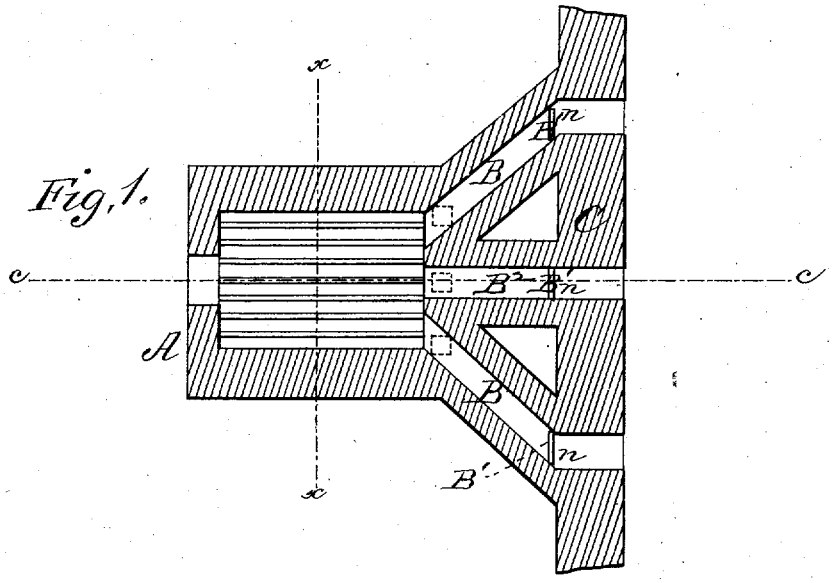
Figure 2:
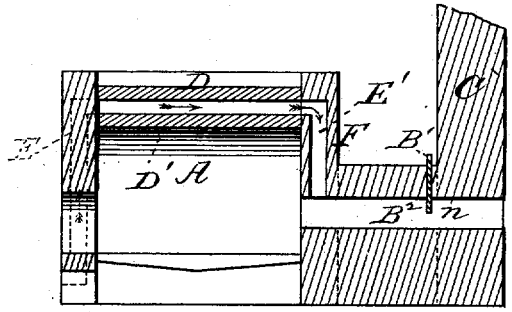
Figure 3:
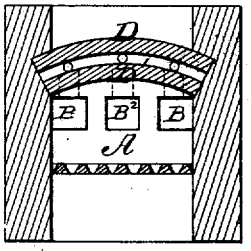

Be it known that I, GEORGE C. SURLS, of Rochester, in the county of Beaver and State of Pennsylvania, have invented a new and useful Improvement in Furnaces for Kilns, of which the following is a specification:

In the accompanying drawing, Figure 1 is a horizontal section of my improved furnace for kilns; Fig. 2, a longitudinal vertical section on the line *c c*, Fig. 1; Fig. 3, a vertical transverse section on the line *x x*.

Similar letters of reference indicate corresponding parts.

My invention relates to a heating-furnace for brick, drain-pipe, and earthenware kilns wherein an intense and regular degree of temperature is required for burning the wares.

The cheapest kind of fuel may be used in this furnace, and such a quantity of combustible gases produced and mingled with heated air conducted thereto that a considerable saving of fuel is obtained by the more complete combustion of the same.

My invention consists of a furnace of suitable capacity with double arches placed over the fire-box, which form an air-space, connecting with front air-flues for heating the air, and conducting the same by rear flues to flues connecting the furnace with the kiln, so as to produce the intermixture and complete combustion of the fire-gases on their entrance to the kiln.

It also consists in a furnace outside of the kiln-wall and spaced therefrom, and connected with the arches of the kiln by one or more independent exposed flues, each leading into an independent kiln-arch, whereby, in the event of injury to said flues, they may be got at for repairs without tearing down the back of the furnace or the kiln-wall.

It also consists in a furnace outside of and spaced from the kiln-wall, and connected with the kiln-arches by independent exposed flues, each provided with a damper outside of the kiln-wall, whereby the said dampers may be conveniently got at and operated.

It also consists in a furnace outside of and spaced from the kiln-wall, and connected with two or more adjoining arches of the kiln by independent flues, either at right angles to the furnace and kiln or oblique thereto, as will be hereinafter more fully explained.

It also consists, in connection with a brick-kiln, of a furnace built outside of the kiln-wall at right angles thereto, and having a rear wall of its own provided with flue-openings, which are connected with the openings through the kiln-wall or mouths of the kiln-arches by a series of independent flues, one for each kiln-arch, whereby one furnace may be made to heat several kiln-arches.

In the drawing, the letter A designates a furnace of suitable size, the rear wall F of which is spaced from the adjoining wall of the kiln, and connected with the eyes of the wall C, leading into the mouths of the kiln-arches, by a series of independent exposed flues, B $B^2$. These flues each lead into a separate arch, and are provided outside of the kiln-wall, at the mouths *n* of the arches of the kiln, each with a damper, $B^1$. When several adjoining arches of the kiln are heated by one furnace of less width than the combined widths of the arches and intermediate benches at their ends next to the furnace or at their mouths, the flues may be made to spread from the furnace to meet the mouths of the kiln-arches. The flues $B^2$ B, being exposed, may be readily got at for repairs, if injured, without tearing down the kiln-wall or furnace-back. The dampers may be also readily operated for the same reason.

The fire-chamber is roofed over by two concentric spaced arches, D D′, seated on suitable bearings or skew-backs of the side walls of the furnace, and forming an air-chamber for heating the air passing through between the arches. Front air-flues E serve to conduct the air into the space between the arches, whence it passes down the rear flues E′ to the flues B $B^2$, where, in a heated condition, it is brought into contact with the fire-gases from the furnace and mingled therewith, so as to cause their complete combustion as they enter the mouths of the arches of the kiln. The air-passage between the roof-arches of the furnace, being constantly supplied with cool air, serves to retard the burning out of the lower arch by keeping it comparatively cool, and at the same time the heat taken up by the air is utilized in accelerating the combustion of the inflammable gases from the furnace.

What I claim as new, and desire to secure by Letters Patent, is—

1. The combination of the double arch of the furnace and its air-conducting front and rear flues with the kiln-connecting flues, for producing the intermingling and complete combustion of the heated air and the fire-gases at the mouths of the arches of the kiln, substantially as specified.

2. The combination, with two or more kiln-arches and a single furnace separated from the kiln-wall by an intervening space, of two or more flues passing through the intermediate space to the eyes of the kiln, whereby several adjoining arches of the kiln may be heated by one furnace of less width than the combined widths of the arches and intermediate bench or benches, substantially as specified.

3. The combination, with several independent kiln-arches having separate mouths, of a single external furnace-chamber at right angles with the face of the kiln-wall, having independent flues leading to said mouths, substantially as specified.

4. The combination of a furnace built outside of the kiln, and having its rear wall F spaced from the kiln-wall C, with the kiln-arches and straight or diverging flues $B^2$ B, each flue leading from the furnace-chamber into the outer end of the kiln-arch, substantially as specified.

5. In a brick-kiln, the combination, with an exterior furnace, feeding several kiln-arches, of the independent spreading-flues, extending from the furnace to said arches, and the regulating-dampers in said flues, substantially as specified.

In testimony that I claim the above I have hereunto subscribed my name in the presence of two witnesses.

GEORGE C. SURLS.

Witnesses:
J. G. RENSLEY,
WM. G. BRACKEN.